United States Patent
Bisse

(10) Patent No.: US 8,301,298 B2
(45) Date of Patent: Oct. 30, 2012

(54) SYSTEM AND METHOD FOR PARCEL SINGULATION BASED ON COLLISION DETECTION

(75) Inventor: Emmanuel Bisse, Washington, NJ (US)

(73) Assignee: Siemens Aktiengesellschaft, Munich (DE)

( * ) Notice: Subject to any disclaimer, the term of this patent is extended or adjusted under 35 U.S.C. 154(b) by 659 days.

(21) Appl. No.: 12/553,190

(22) Filed: Sep. 3, 2009

(65) Prior Publication Data

US 2010/0057248 A1 Mar. 4, 2010

Related U.S. Application Data

(60) Provisional application No. 61/094,158, filed on Sep. 4, 2008.

(51) Int. Cl.
*G06F 7/00* (2006.01)
(52) U.S. Cl. ........................ 700/230; 198/357
(58) Field of Classification Search .......... 700/230; 198/348, 357, 434, 444
See application file for complete search history.

(56) References Cited

U.S. PATENT DOCUMENTS

| 5,094,337 A * | 3/1992 | van Veldhuisen et al. .... 198/357 |
| 6,435,331 B1 | 8/2002 | Olson et al. |
| 8,170,712 B2 * | 5/2012 | Battles et al. ................. 700/216 |
| 2003/0141165 A1 | 7/2003 | Reznik et al. |

FOREIGN PATENT DOCUMENTS

| WO | 00/76887 A | 12/2000 |
| WO | 2005/114340 A | 12/2005 |

OTHER PUBLICATIONS

International Search Report dated Dec. 16, 2009.

* cited by examiner

*Primary Examiner* — Ramya Burgess

(57) ABSTRACT

According to an aspect of the invention, there is provided a method for detecting collisions of parcels on a moving conveyor belt, including the steps of representing each belt with a rectangular cell mesh of columns and rows, for each parcel on the belt system, identifying those cells on a belt where each parcel contacts the belt, marking a parcel's new cell position after a predetermined time frame in a direction parallel to the motion, for each marked cell, incrementing a corresponding collision detector counter in a collision detection table, marking a parcel's new cell position after the predetermined time frame in a direction perpendicular to the motion, for each marked cell, incrementing a corresponding collision detector counter in the collision detection table, and checking the collision detector counter value in each cell, where a value greater than or equal to 3 indicates a parcel collision.

23 Claims, 11 Drawing Sheets

SYSTEM AND METHOD FOR PARCEL SINGULATION BASED ON COLLISION DETECTION

CROSS REFERENCE TO RELATED UNITED STATES APPLICATIONS

This application claims priority from "Collision Detection Based Optimal Parcel Singulation Strategy", U.S. Provisional Application No. 61/094,158 of Emmanuel Bisse, filed Sep. 4, 2008, the contents of which are herein incorporated by reference in their entirety.

TECHNICAL FIELD

This disclosure is directed to methods for collision avoidance for parcels on a conveyor belt.

DISCUSSION OF THE RELATED ART

A belt matrix based parcel singulator based on a belt matrix is capable of singulating 6000 parcels per hour (6K) on dual takeaways. Such machines are compact and quiet. Parcels on the singulation bed were represented in a computer memory in one or two lists, and the singulation focused only on one parcel at a time in a list. However, this process wastes time and space where one could simultaneously process other parcels. Although 6K is an impressive number, there are parcels singulators on the market that acheive higher throughput using different technologies.

SUMMARY OF THE INVENTION

Exemplary embodiments of the invention as described herein generally include methods and systems for optimizing the singulation of parcels by detecting potential collisions to improve the throughput of the singulator. A method according to an embodiment of the invention singulates parcels by extracting, rotating and gapping parcels on an opportunity basis. If one of these actions can be performed on a parcel without collision with another parcel, it will be performed as soon as possible.

According to an aspect of the invention, there is provided a method for detecting collisions of parcels on a conveyor belt system comprising a rectangular array of individual conveyor belts, including the steps of representing each belt of a conveyor belt system with a rectangular cell mesh of columns and rows, where each belt moves with an associated belt speed, for each parcel on the belt system, identifying those cells on a belt where each parcel contacts the belt, predicting a parcel's cell position after a predetermined time frame in a direction parallel to the motion of the conveyor belt system, marking a corresponding entry in a parallel motion table representing motion in a parallel direction, for each marked cell in the parallel motion table, incrementing a collision detector counter in a corresponding cell in a collision detection table, predicting a parcel's cell position after the predetermined time frame in a direction perpendicular to the motion of the conveyor belt system, marking a corresponding entry in a perpendicular motion table representing motion in a perpendicular direction, and for each marked cell in the perpendicular motion table, incrementing a collision detector counter in a corresponding cell in the collision detection table, and checking the collision detector counter value in each cell in the collision detection table, where a value greater than or equal to 3 is indicative of a parcel collision.

According to a further aspect of the invention, predicting a parcel's position in a direction parallel to the motion of the conveyor belt system includes calculating a number of cell jumps in the parallel direction for an initial occupied cell on a current belt, based on the speed of the current belt, until either an end of a current time frame is reached or an end of the current belt is reached, where if the end of the current time frame is reached before reaching the end of the current belt, designating the occupied cell associated with the end of current time frame as the initial occupied cell's predicted position in a parallel direction, and predicting a final occupied cell for each other occupied cell for the parcel by incrementing each other occupied cell by the number of cell jumps.

According to a further aspect of the invention, if the end of the current belt is reached before the end of the current time frame, calculating, for each occupied cell, a total number of parallel cell jumps to the end of the current time frame based on the speed of the current belt and the speed of a next belt, computing, for each occupied cell, a remaining distance in the current belt from the length of the current belt and the number of cells from the initial position of each occupied cell to the end of the current belt, computing, for each occupied cell, the time needed to cover the remaining distance in the current belt from the speed of the current belt and the duration of the current time frame, and computing, for each occupied cell, a final cell based on time needed to cover the remaining distance, the speed of a next belt, and the length of each cell on the next belt.

According to a further aspect of the invention, predicting a parcel's position in a direction perpendicular to the motion of the conveyor belt system includes counting a number of cell jumps in the perpendicular direction for each occupied cell on a current belt, based on a rotation speed of each parcel, until either an end of a current time frame is reached or an end of the current belt is reached, where if the end of the current time frame is reached before reaching the end of the current belt, designating the occupied cells associated with the end of current time frame as the parcel's predicted position in a perpendicular direction.

According to a further aspect of the invention, if the end of the current belt is reached before the end of the current time frame, calculating, for each occupied cell, a total number of perpendicular cell jumps to the end of the current time frame based on duration of the time frame, the speed of the current belt, and the widths of the cells, computing, for each occupied cell, a number of cells to an edge of the current belt from the width of the current belt and the number of cells from the initial position of each occupied cell to the edge of the current belt, computing, for each occupied cell, the number of remaining cells from the number of cells to the edge of the current belt and the total number of perpendicular cell jumps, where a final cell in an adjacent belt corresponds to a last remaining cell.

According to a further aspect of the invention, when the number of remaining cells is greater than a number of cells in a width of an adjacent belt, the method comprises reducing the number of remaining cells by the number of cells in the width of the adjacent belt.

According to a further aspect of the invention, marking a corresponding cell in a parallel motion table representing motion in a parallel direction includes initializing a bit table representing belt motion in the parallel direction to one for all occupied cells and zero for all unoccupied cells, where each cell of a belt is represented by one bit in the table, and marking an entry corresponding to a cell's predicted parallel position by setting the corresponding bit to one for occupied cells, and zero for unoccupied cells.

According to a further aspect of the invention, marking a corresponding cell in a perpendicular motion table representing motion in a perpendicular direction includes initializing a bit table representing belt motion in the perpendicular direction to one for all occupied cells and zero for all unoccupied cells, where each cell of a belt is represented by one bit in the table, and marking an entry corresponding to a cell's predicted perpendicular position by setting the corresponding bit to one for occupied cells, and zero for unoccupied cells.

According to a further aspect of the invention, each cell of the parallel motion table and the perpendicular motion table is represented by an associated counter byte in the collision detection table, a same cell in both parallel motion table and the perpendicular motion table is represented by a same byte in the collision detection table.

According to a further aspect of the invention, when a parcel's predicted cell position after a predetermined time frame is on a subsequent belt, the method includes shifting a bit map for a subsequent belt by a number of units representing a number of cells corresponding to a distance the parcel is displaced on the subsequent belt during the time frame, and for each marked entry in the parallel motion table and the perpendicular motion table, creating an temporary bit table with all bits initialized to zero, setting a first bit set to one and shifting the temporary table in a same direction as the bit map by a number of bits representing a final cell position of the parcel on the subsequent belt, and performing a bitwise OR operation of bits in the temporary table with the bit map.

According to another aspect of the invention, there is provided a program storage device readable by a computer, tangibly embodying a program of instructions executable by the computer to perform the method steps for detecting collisions of parcels on a conveyor belt system comprising a rectangular array of individual conveyor belts.

DETAILED DESCRIPTION OF EXEMPLARY EMBODIMENTS

Figure 1:
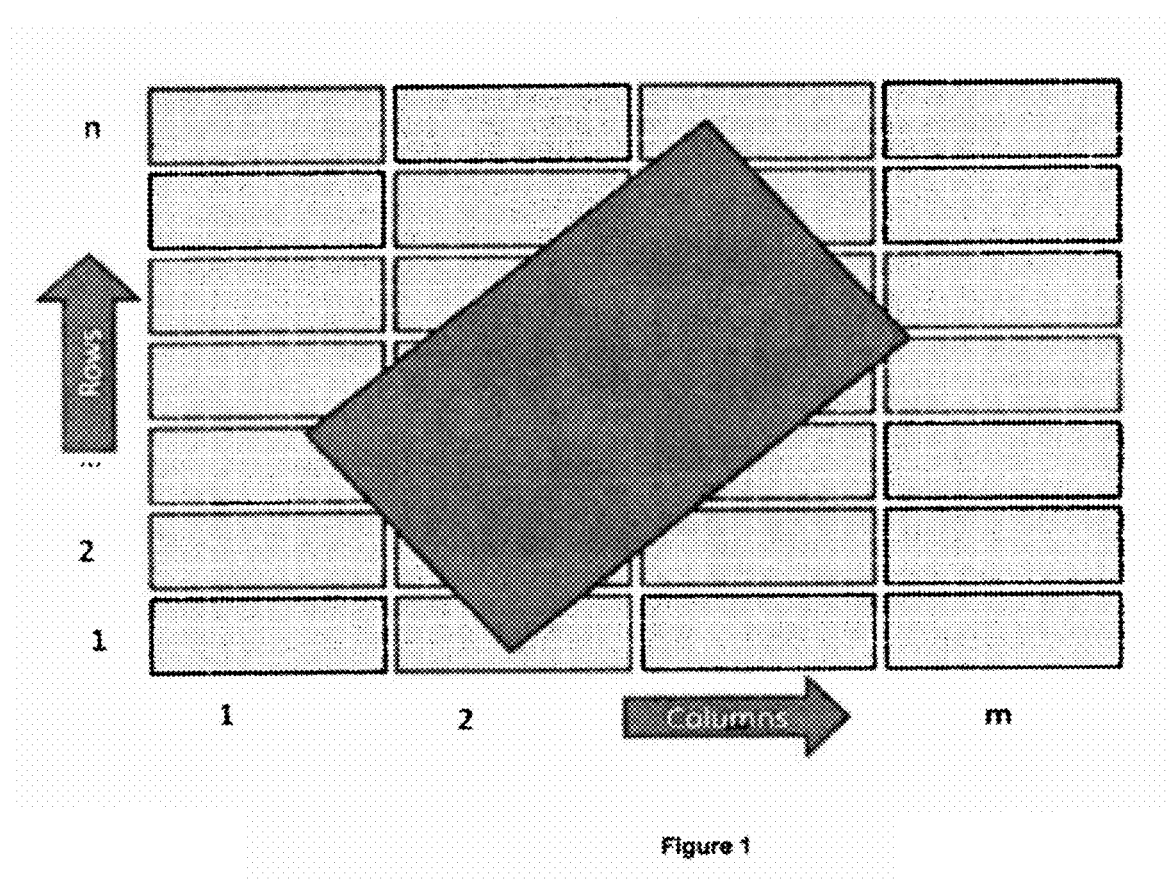
FIG. 1 depicts an exemplary parcel on a bed matrix of a conveyor belt, according to an embodiment of the invention.

Exemplary embodiments of the invention as described herein generally include systems and methods for optimizing the singulation of parcels by detecting potential collisions. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

According to an embodiment of the invention, it may be assumed that all parcels locations and shapes are known and described by a list of two dimensional coordinate vertices which are projections of parcel corners onto the singulator bed. In general, collision detection includes taking the current location of the parcels, predicting their future motions as displacements in a two dimensional space, and finding any intersection of parcel surface locations in the predicted configurations. Although most parcels are rectangular, the computation of their spatial positions involves trigonometric calculations which are time consuming. According to an embodiment of the invention, collision detection strategy is based on a degraded localization of the parcel. The degraded localization can speed-up collision detection, and can be used for path planning. The goal of collision detection is to determine a likelihood of a collision at a given location. When it is determined that a collision is likely, a more detailed evaluation may be performed for confirmation.

Consider a parcel on a matrix bed of a conveyor belt, such as the parcel 10 shown in FIG. 1. The matrix bed itself has n rows and m columns of belts. A collision detection method according to an embodiment of the invention assumes that: (1) a potential collision can be detected within a frame or a cycle period; (2) the speed of the belts remains constant during that period (or the variations are negligible); (3) the parcels are not sliding on the belts; and (4) the surface under the parcel has the same horizontal motion as the belt itself.

Figure 2:
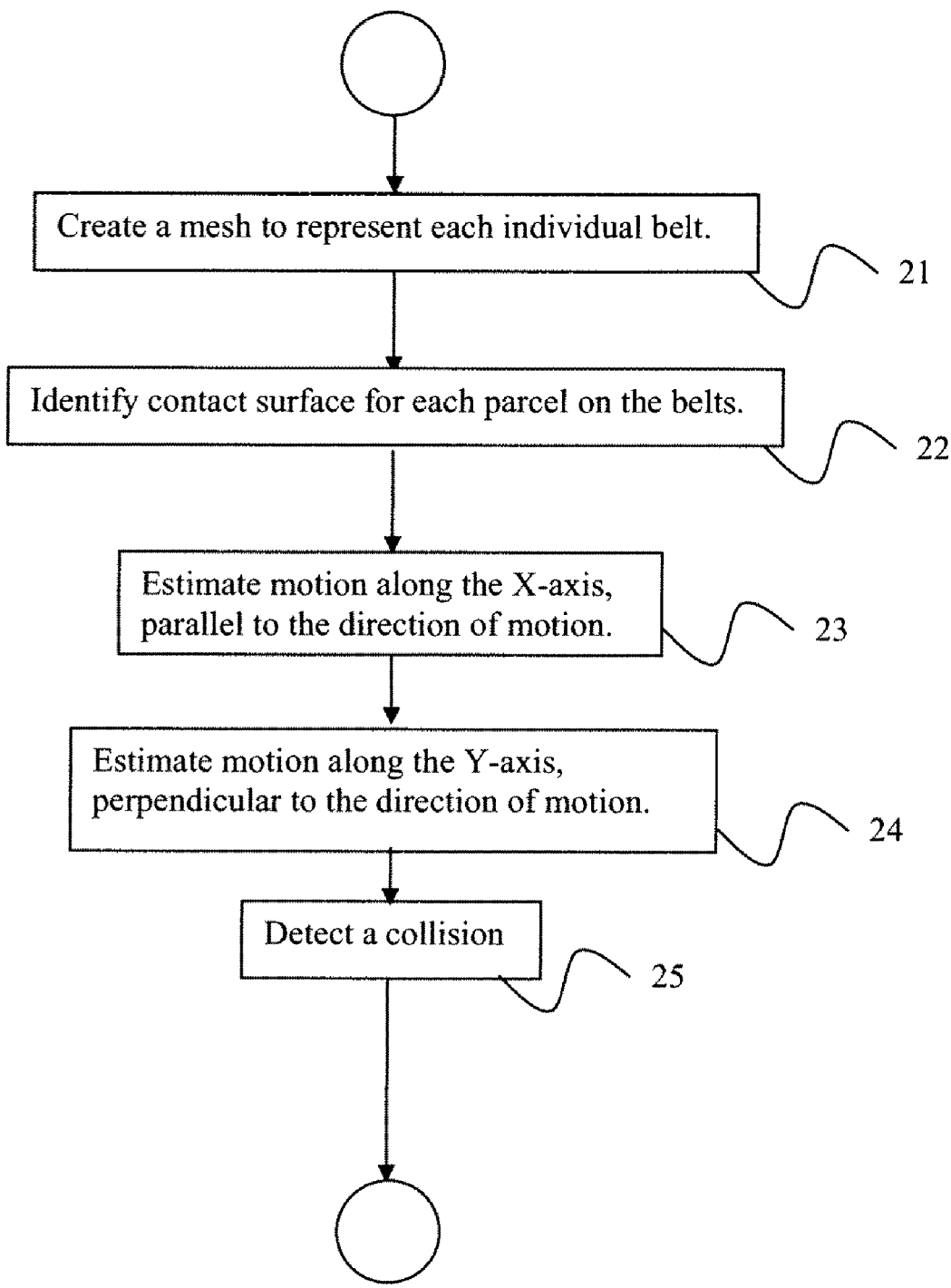
FIG. 2 is a flow chart of a collision detection method, according to an embodiment of the invention.
Figure 3:
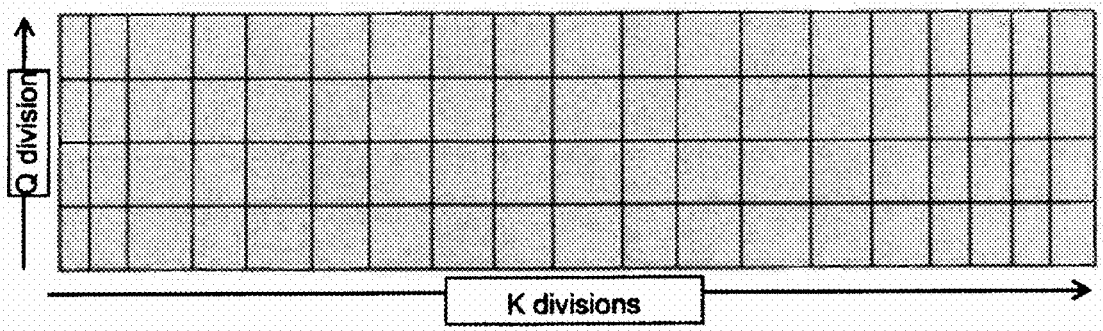
FIG. 3 depicts an exemplary mesh on a belt, according to an embodiment of the invention.

A flow chart of a collision detection method according to an embodiment of the invention is shown in FIG. 2. To approximate the region of the bed matrix in contact with the parcel, a method begins at step 21 by creating a mesh to represent the individual belts. For simplicity and given that all belts are rectangular, a rectangular mesh of K columns and Q rows was created. An exemplary belt mesh is shown in FIG. 3. The individual cells of the belts are not necessarily squares and may have different dimensions.

Figure 4:
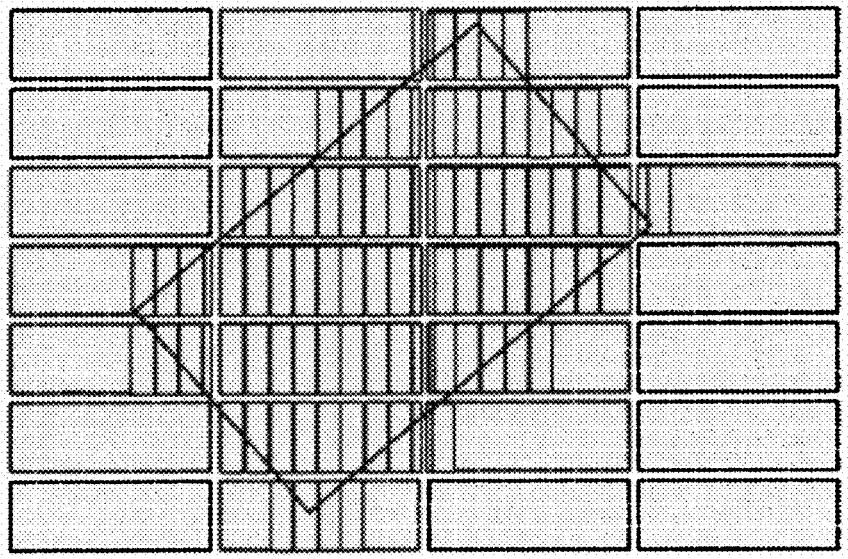
FIG. 4 illustrates those cells occupied by a parcel, according to an embodiment of the invention.

The contact surface for each parcel is identified at step 22 using a coarse resolution. For example, for this step one can set Q=1 and K≧1, as shown in FIG. 4, with the occupied cells indicated by reference number 40.

Figure 5:
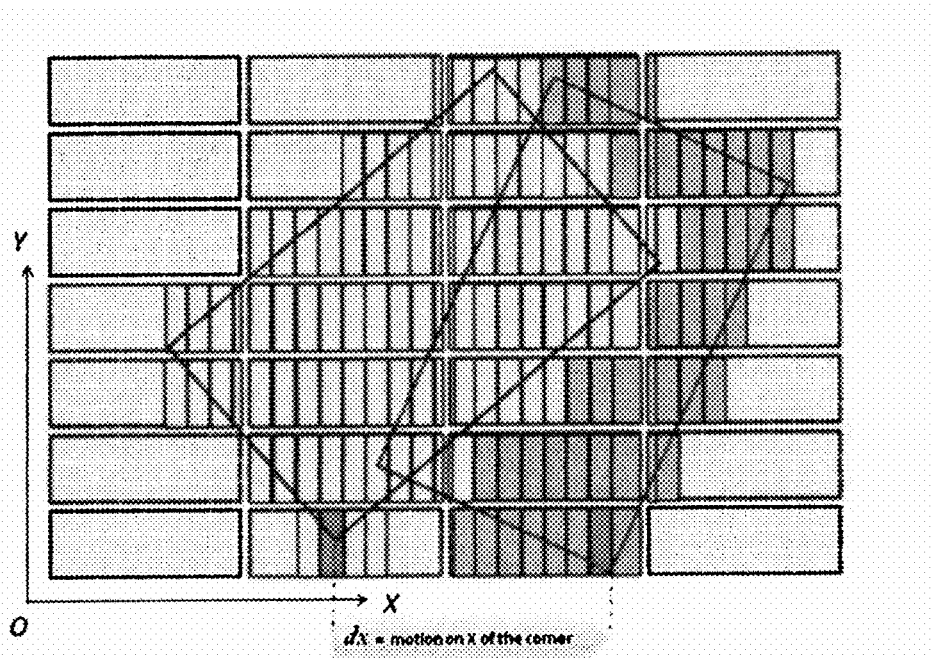
FIG. 5 illustrates cell motion on the X axis, according to an embodiment of the invention.

Referring back to FIG. 2, motion along the X-axis, the axis parallel to the forward motion of the belts, is estimated at step 23. FIG. 5 shows the position of a parcel at two different times along a belt. One can assume that the elapsed time between the two positions is equivalent to a period. The rectangle 52 occupies cells 51 while the rectangle 53 has moved forward. Rectangle 53 partially over-laps rectangle 52 and occupies some previous cells 51 and some new cells 54. Cell 55 is the cell occupied by the lowest corner of rectangle 52, and cell 56 is the cell occupied by the lowest corner of rectangle 53. As the figure shows, when rectangle 52 moves to the rectangle 53 location, that corner cell moves as shown. Define dx as the value of that displacement on the X axis. Since the speed of each belt is known and assumed fixed during a period, the displacement of the cell containing the lowest corner of the rectangle 52 can be estimated as follows.

Figure 6:
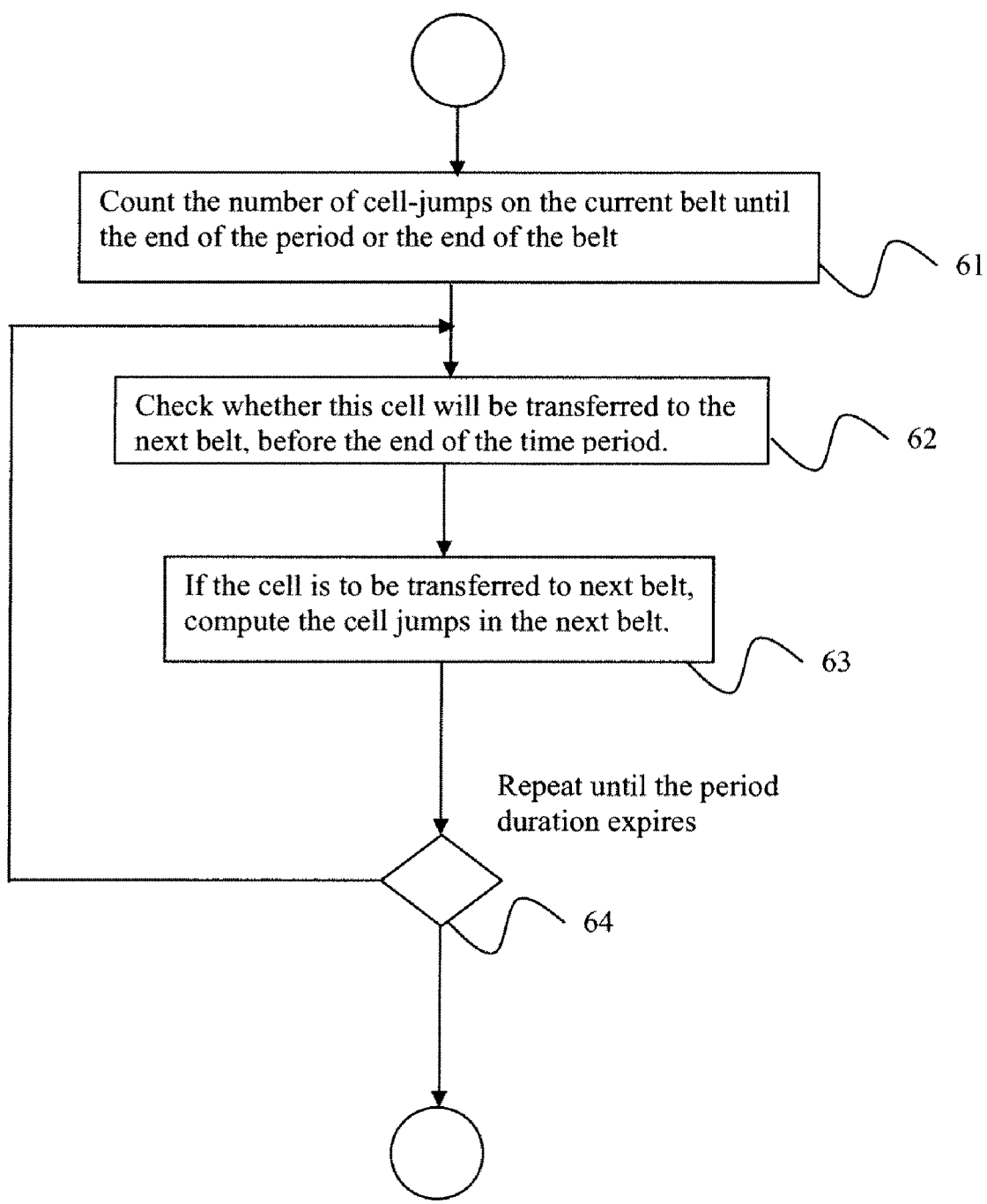
FIG. 6 is a flowchart of a method for determining cell displacement in the X (parallel) direction during one time frame is presented, according to an embodiment of the invention.

A flowchart of a method for determining cell displacement in the X (parallel) direction during one time frame is presented in FIG. 6. Referring to the figure, based on the speed of the belt on which the corner started its motion:

step (61) Count the number of cell jumps on the current belt until the end of the period or the end of the belt;

step (62) If the end of the belt is reached before the end on the period, transfer the cell to the next belt forward;

step (63) On the next belt, use the speed of the current belt to calculate the cell-jumps; and step (64) Repeat steps (2) and (3) until the period duration expires.

For example, consider a corner starting on belt $n_l$ with speed $V_{n_l,X}$ that continues on belt $n_{l+1}$ with speed $V_{n_l+1,X}$. Assume that T is the period and $T_{n_l}$ the time the corner spent on belt $n_l$ and $T_{n_l+1}$ the time spent on belt $n_{l+1}$. There are the following equations:

$$\begin{cases} T = T_{n_1} + T_{n_1+1}, \\ dx = T_{n_1} V_{n_1 X} + T_{n_1+1} V_{n_1+1, X}. \end{cases} \quad (1)$$

To simplify the calculations, one can assume in an embodiment of the invention an equidistant division of the belt on the X axis. However, it will be readily apparent to one of skill in the art how to generalize the following equations to the case of unequal subdivisions of the belt into cells. Therefore, the cell length $\Delta L_{n_1,X}$, given a belt length of $BL_1$ and K divisions on X will the expressed as follows:

$$\Delta L_{n_1 X} = \frac{BL_1}{K}. \quad (2)$$

The number of cells-jump on the belt n, will then be computed as follows:

1. First, compute the cells jump for the full period given the speed of $V_{n_1,X}$:

$$\Delta N_{n_1 T} = \frac{T V_{n_1 X}}{\Delta L_{n_1 X}}. \quad (3)$$

2. Check whether this cell will be transferred to the next belt. First, assume the position of the corner is on the cell $k_{n_1,i}$. The cell will be transferred to the next belt if $$k_{n_1 i} + \Delta N_{n_1 T} > K. \quad (4)$$

3. If the cell is to be transferred to next belt, compute the remaining distance $$(\Delta L_{T_{n1}}),$$

i.e. the distance not covered in the belt $n_1$ because the belt end was reached before the timer period end, from:

$$\Delta L_{T_{n1}} = (K - k_{n_1 i}) \Delta L_{n_1 X}. \quad (5)$$

4. Compute the time $T_{n_1}$ to cover the distance $$(\Delta L_{T_{n1}})$$

as follows:

$$T_{n_1} = (K - k_{n_1 i}) \frac{\Delta L_{n_1 X}}{V_{n_1 X}} = \frac{\Delta L_{T_{n1}}}{V_{n_1 X}}. \quad (6)$$

5. The remaining time of the period $T_{n_1+1} = T - T_{n_1}$ is the time that the cell moves in the next belt with the speed $V_{n_1+1,X}$. Assuming the cells length on the X axis to be $\Delta L_{n_1+1,X}$, the cells jump on that belt will be:

$$k_{n_1+1,i} = \frac{T_{n_1+1} V_{n_1+1, X}}{\Delta L_{n_1+1, X}}. \quad (7)$$

Figure 7:
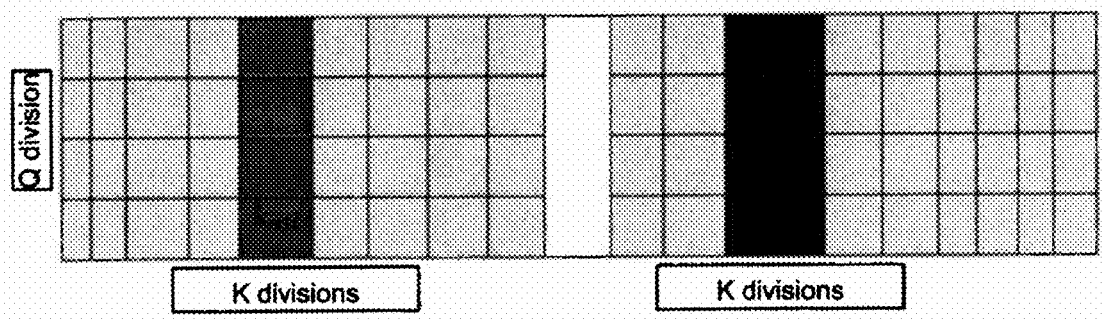
FIG. 7 illustrates an exemplary cells-jump from one belt to another over one period, according to an embodiment of the invention.

An exemplary cells-jump from one belt to another over one period is illustrated in FIG. 7.

Figure 8:
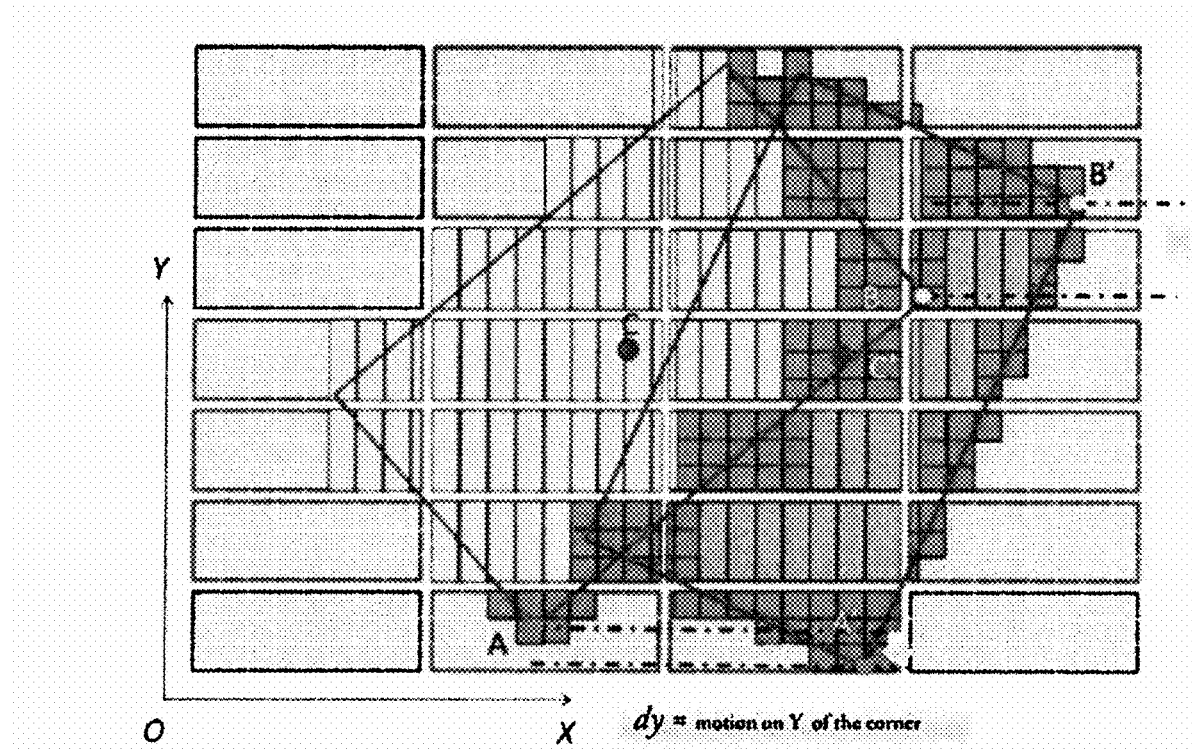
FIG. 8 illustrates forward and rotational motion of a parcel on a belt, according to an embodiment of the invention.

Referring again to FIG. 2, motion along the Y-axis, the axis perpendicular to the forward motion of the belts, is estimated at step 24. When a parcel rotates as it moves forward, some points of the parcel will have both horizontal and vertical motions. FIG. 8 illustrates forward and rotational motion of a parcel on a belt. As shown in FIG. 8, some points on the parcel move up on Y axis as B to B' and some other move down such as A to A'. The magnitude of these displacements depends on the rotation speed w of the parcel, and the location of the point on the parcel. For this example, consider point B that moves to B' in the course of this frame of motion.

At the beginning of the period the point B is on belt $n_l$ and it has a speed $V_{n_1,Y}$. At the completion of this motion frame or period, this point passes onto belt $n_{l+1}$ with speed $V_{n_1+1,Y}$. The vertical speed, as will be shown below, is not constant and it is highly nonlinear. For simplicity, assume that it remains constant during a period. However, assuming that the box is solid, the distance CB should be the same as C'B' where C and C' are projections of the center of mass on the surface at rectangle 82 and 83 locations respectively. Therefore the distance dy is estimated as follows:

$$\begin{cases} dy = T V_{n_1 Y}, \\ \text{and} \\ dy = \sqrt{\|CB\|^2 - dx^2}. \end{cases} \quad (8)$$

To simplify the calculations, assume an equidistant division of the belt on the Y axis. Therefore, the cell width $\Delta W_{n_1 Y}$ is $$\Delta W_{n_1 Y} = \frac{BW_1}{Q}, \quad (9)$$

where a belt width is $BW_1$ and Q is the number of divisions.

Figure 9:
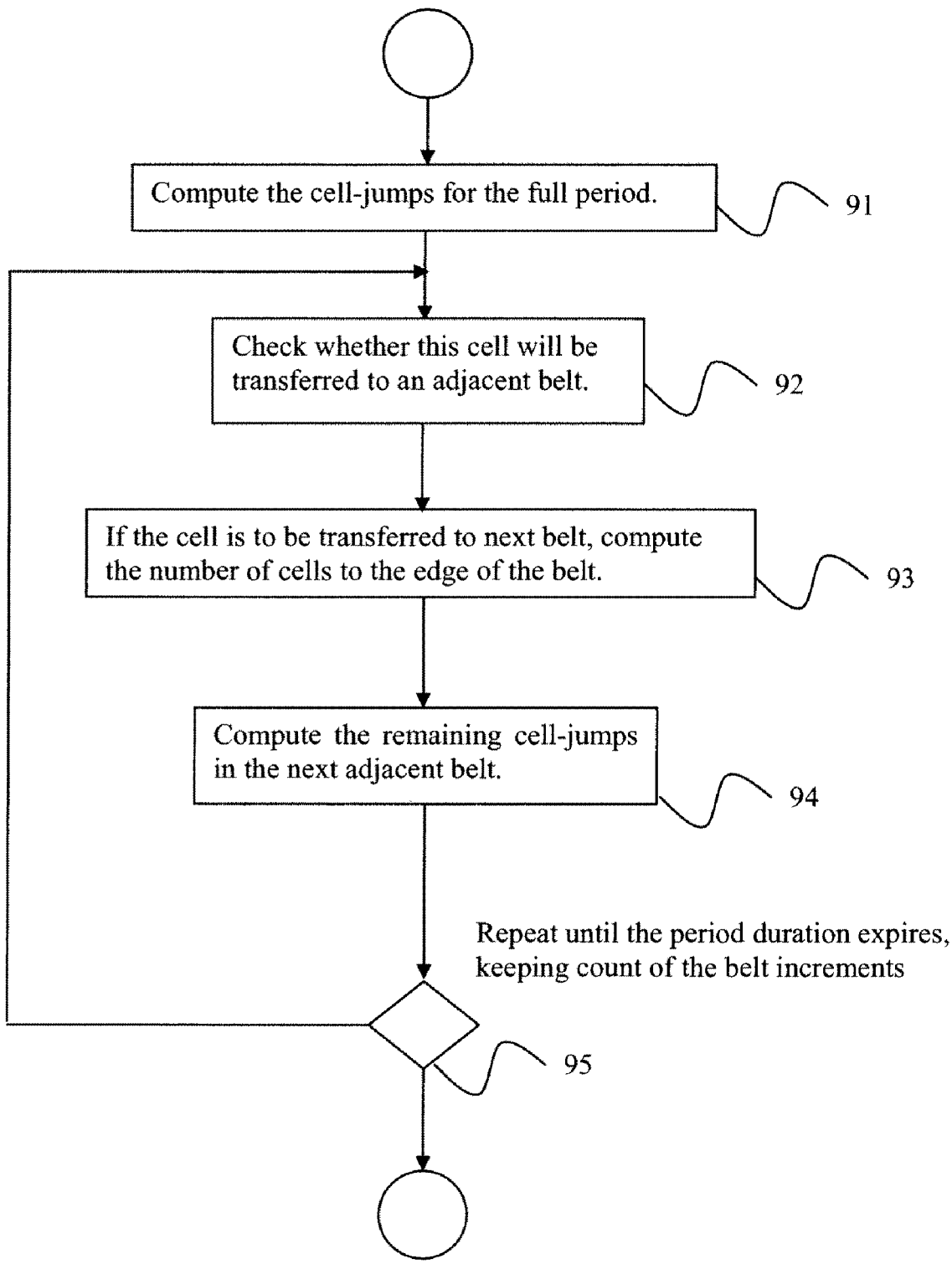
FIG. 9 is a flowchart of a method for determining cell displacement in the Y (perpendicular) direction during one time frame is presented, according to an embodiment of the invention.

A flowchart of a method for determining cell displacement in the Y (perpendicular) direction during one time frame is presented in FIG. 9. Referring now to the figure, the number of cell-jumps on the belt $n_1$ in the Y direction can be computed as follows.

Step 91: compute the cell-jumps for the full period given the speed $V_{n_1Y}$:

$$\Delta M_{n_1T} = \frac{TV_{n_1Y}}{\Delta W_{n_1Y}} = \frac{\sqrt{\|CB\|^2 - dx^2}}{\Delta W_{n_1Y}}. \quad (10)$$

Step 92: Check whether this cell will be transferred to an adjacent belt. Assume the position of the corner is on the cell $q_{n_1i}$. The cell will be transferred to the adjacent belt if $$q_{n_1i} + \Delta M_{n_1T} > Q. \quad (11)$$

Step 93: If the cell is to be transferred to the next adjacent belt, compute the number of cells $\Delta W_{n_1T}$ to the edge of the belt $n_1$:

$$\Delta W_{n_1T} = Q - q_{n_1i}. \quad (12)$$

Step 94: Compute the remaining cell-jumps:

$$\Delta RW_{n_1+j} = \Delta M_{n_1T} - \Delta W_{n_1T}, \quad (13)$$

with j=0 for the next adjacent belt.

Step 95: Repeat steps 92 to 94 until the period duration expires, replacing $\Delta M_{n_1T}$ with $\Delta RW_{n_1+j}$ in EQ. (11) in step 92 while keeping count of the belt increments until the equation is no longer satisfied.

The remaining cell-jumps $\Delta RW_{n_1+j}$ is the cell number of the final position of point B' at the end of the motion period.

Figure 10:
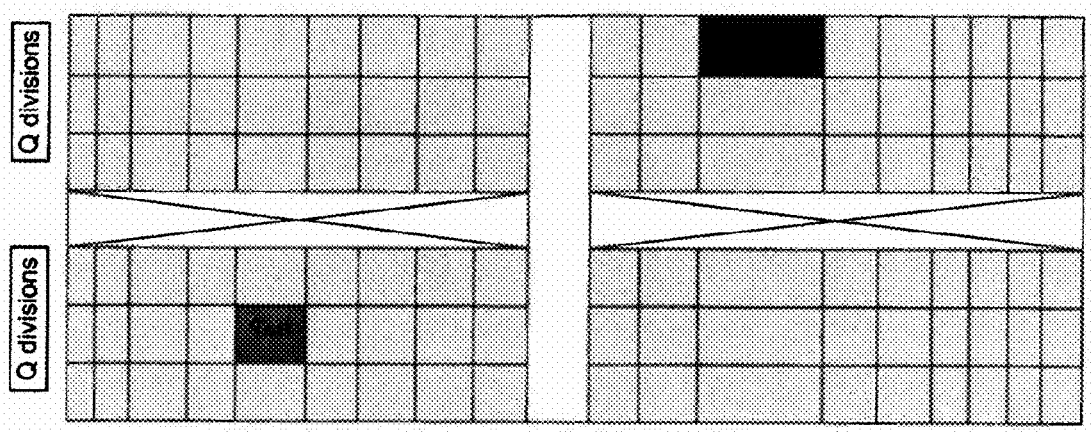
FIG. 10 illustrates a cells jump in the Y direction, according to an embodiment of the invention.

FIG. 10 illustrates a cells-jump in the Y direction, according to an embodiment of the invention.

Returning to FIG. 2, a next step 25 is detecting a collision. According to an embodiment of the invention, several data structures are useful for collision detection. First, a bit representation of cells is constructed for each belt. A fine cell grid could have, for example, K=64 and Q=8, or 64 by 8 bits, and a coarse representation could have K=8 and Q=1. Note that a different sized grid can be used for each different belt. In addition, using this bit representation, three tables are provided that are representative of the whole Singulator Belt matrix. There is one table for storing the representation of the cells motion in the X (parallel) direction, a second table for storing the representation of the cells motion in the Y (perpendicular) direction, and a third table that stores the collisions status of the cell. This table may be referred to as the collision detection table. Each cell of the X and Y motion table has an associated counter byte representing it in collision detection table. The same cell number in both the X and Y tables has the same representative in the collision detection table. The X and Y tables are initialized with the positions of all parcels at the beginning of the period, and the collision table is initialized with zeros.

Figure 11:
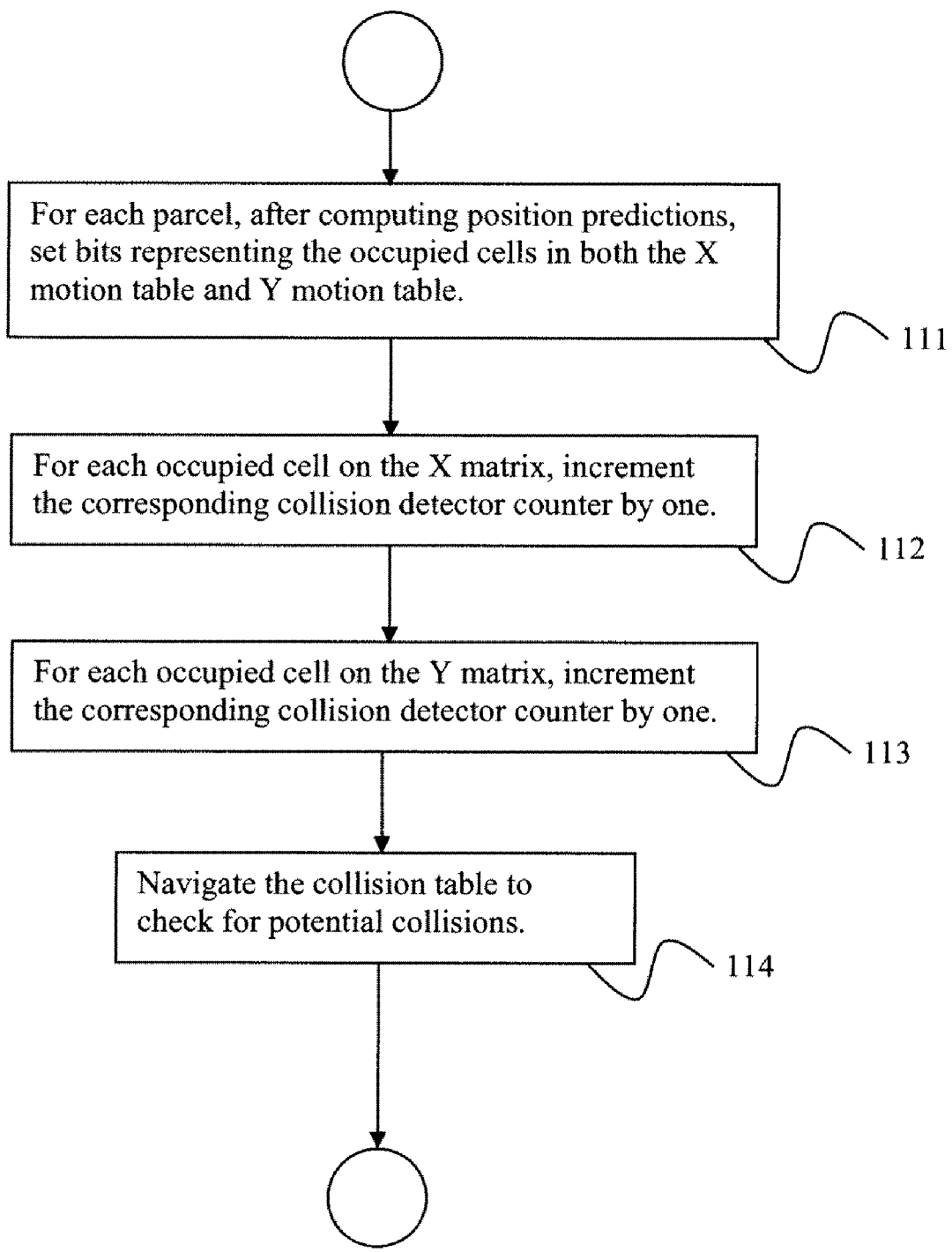
FIG. 11 is a flowchart of a method for detecting collisions, according to an embodiment of the invention.

There is a potential collision if the value of the collision detector byte is greater than two at the end of a test. A flowchart of a method for detecting collisions is presented in FIG. 11. At step 111, for each parcel in the singulator bed, after computing its position predictions, bits representing the occupied cells are set to true and bits representing the non occupied cells are set to false in both the X motion table and Y motion table. At step 112, for each occupied cell on the X matrix, the corresponding collision detector counter is incremented by one. Similarly, at step 113, for each occupied cell on the Y matrix, the corresponding collision detector counter is incremented by one. Therefore, the same parcel could only increment a given detector byte by a maximum of 2 increments. Thus, at step 114, navigate the collision table to check for potential collisions. There is a potential collision if the detector byte counter is $\geq 3$, which indicates that another parcel wants occupy the same cell.

Figure 12:
FIG. 12 depicts an initial bit map for a belt row, with occupied cells marked by an "x", according to an embodiment of the invention.
Figure 13:
FIG. 13 depicts a bit map right shifted by 5 cells, according to an embodiment of the invention.
Figure 14:
FIG. 14 depicts a temporary bit map initialized to zeros, according to an embodiment of the invention.
Figure 15:
FIG. 15 depicts the temporary bit map right shifted by the corner position, according to an embodiment of the invention.
Figure 16:
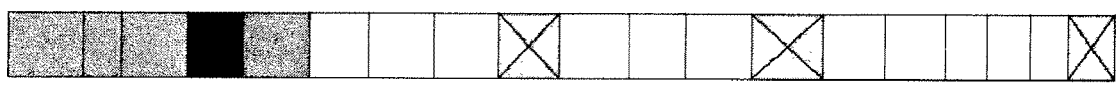
FIG. 16 depicts the final bit map after ORing the temporary bit map with the shifted bit map, according to an embodiment of the invention.
Figure 17:
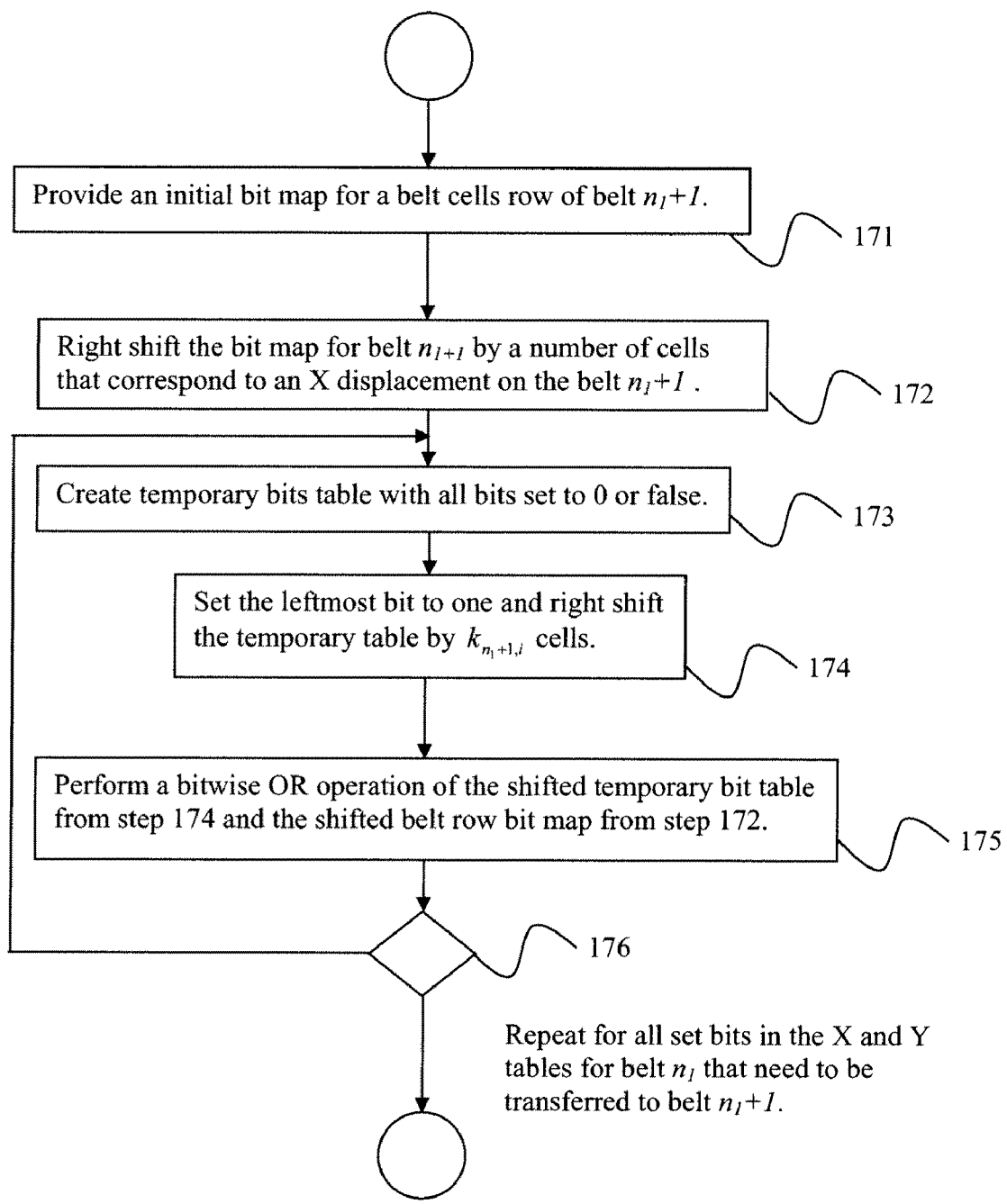
FIG. 17 is a flow chart of a method for transferring the bits from one belt to another belt, according to an embodiment of the invention.

When a parcel moves from one belt to another, X and Y table bits describing its location move to the next belt representation as well. Because two different belts may be represented by independent data types, such as bytes, words, double words or long integers, a simple bit shifting operation will not work. Note that in some embodiments of the invention, data types that permit easy bit wise operations are used, however, other embodiments of the invention are not limited thereto. Transferring the bits from one belt to the next belt uses the operations described as follows, with reference to FIG. 17. At step 171, an initial bit map is provided for a belt cells row of belt $n_1+1$, with occupied cells marked by an "x", as shown in FIG. 12. Then at step 172, the bit map for belt $n_1+1$ is right shifted by a number of cells that correspond to an X displacement on the belt, $N_{n_1+1,x} = T_{n_1+1} V_{n_1+1,x}$, with empty cells being entered on the left. FIG. 13 depicts a bit map right shifted by 5 cells. Next, at step 173, a temporary table is created with all bits, set to zero except the leftmost bit that is set to true, as shown in FIG. 14. At step 174, the leftmost bit is right shifted by $k_{n_1+1,i}$ cells, as shown in FIG. 15. At step 175, the shifted bit of the temporary bit map is incorporated to the shifted bit map for belt $n_{1+1}$ by performing a bitwise OR operation of the shifted temporary bit table and the shifted belt cells row bits table. This process of setting a leftmost bit of the temporary table to one and then right shifting it by $k_{n_1+1,i}$ and inserting it as described from step 173 to step 175 is repeated at step 176 for all bits in the X and Y tables that needed to be transferred from one belt to another in the X or Y directions, respectively. FIG. 16 depicts a complete insertion. Then the collision detection algorithm can be executed.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 18:
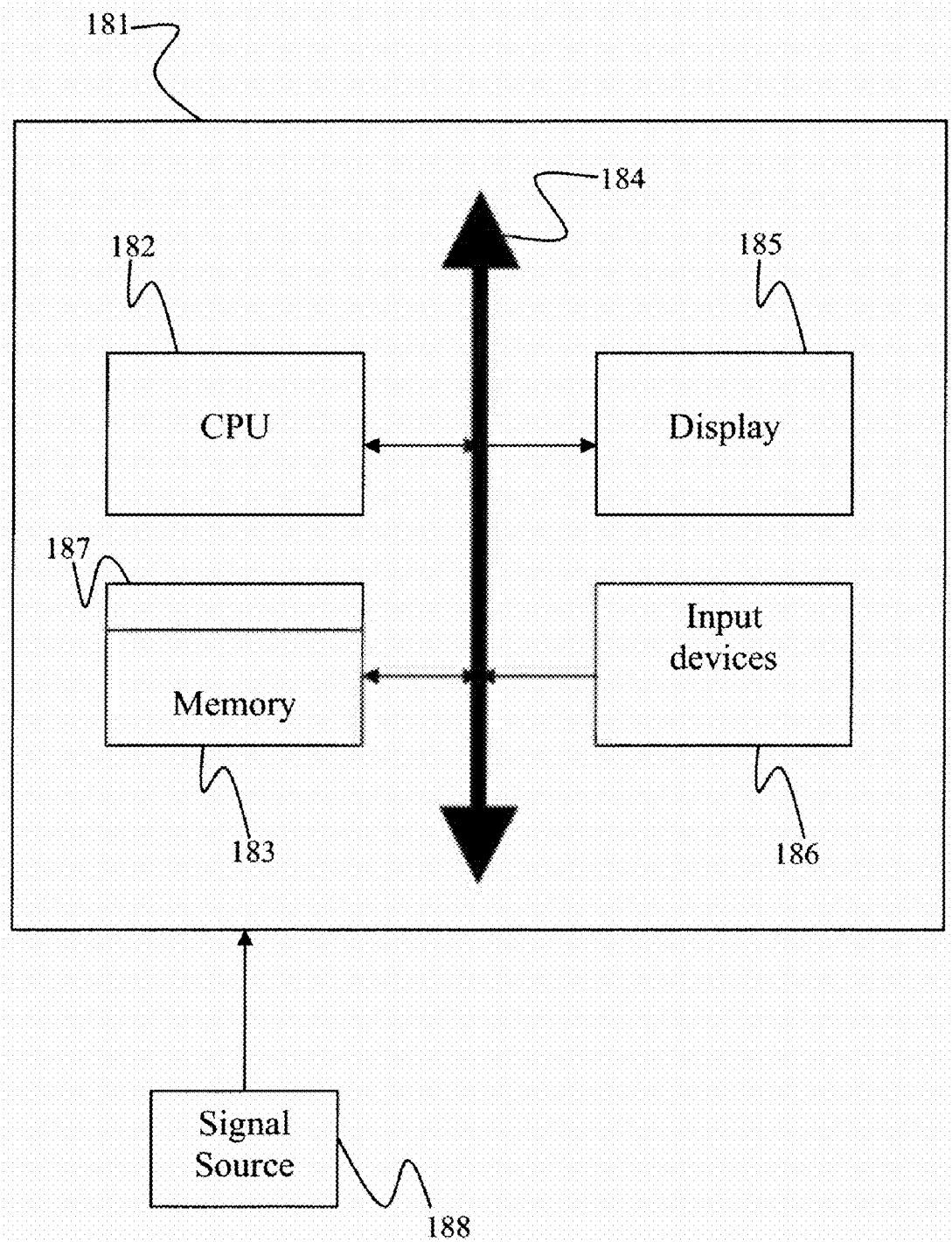
FIG. 18 is a block diagram of an exemplary computer system for implementing a method for optimizing the singulation of parcels by detecting potential collisions, according to an embodiment of the invention.

FIG. 18 is a block diagram of an exemplary computer system for implementing a method for optimizing the singulation of parcels by detecting potential collisions according to an embodiment of the invention. Referring now to FIG. 18, a computer system 181 for implementing the present invention can comprise, inter alia, a central processing unit (CPU) 182, a memory 183 and an input/output (I/O) interface 184. The computer system 181 is generally coupled through the I/O interface 184 to a display 185 and various input devices 186 such as a mouse and a keyboard. The support circuits can include circuits such as cache, power supplies, clock circuits, and a communication bus. The memory 183 can include random access memory (RAM), read only memory (ROM), disk drive, tape drive, etc., or a combinations thereof. The present invention can be implemented as a routine 187 that is stored in memory 183 and executed by the CPU 182 to process the signal from the signal source 188. As such, the computer system 181 is a general purpose computer system that becomes a specific purpose computer system when executing the routine 187 of the present invention.

The computer system 181 also includes an operating system and micro instruction code. The various processes and functions described herein can either be part of the micro instruction code or part of the application program (or combination thereof) which is executed via the operating system.

In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A computer-assisted method for detecting collisions of parcels on a conveyor belt system comprising a rectangular array of individual conveyor belts, the method performed by said computer comprising the steps of:

representing each belt of a conveyor belt system with a rectangular cell mesh of columns and rows, wherein each belt moves with an associated belt speed;

for each parcel on said belt system, identifying those cells on a belt where each said parcel contacts said belt;

predicting a parcel's cell position after a predetermined time frame in a direction parallel to the motion of said conveyor belt system;

marking a corresponding entry in a parallel motion table representing motion in a parallel direction;

for each marked cell in said parallel motion table, incrementing a collision detector counter in a corresponding cell in a collision detection table;

predicting a parcel's cell position after said predetermined time frame in a direction perpendicular to the motion of said conveyor belt system;

marking a corresponding entry in a perpendicular motion table representing motion in a perpendicular direction; and for each marked cell in said perpendicular motion table, incrementing a collision detector counter in a corresponding cell in said collision detection table;

and checking the collision detector counter value in each cell in said collision detection table, wherein a value greater than or equal to 3 is indicative of a parcel collision.

2. The method of claim 1, wherein predicting a parcel's position in a direction parallel to the motion of said conveyor belt system comprises:

calculating a number of cell jumps in said parallel direction for an initial occupied cell on a current belt, based on the speed of said current belt, until either an end of a current time frame is reached or an end of the current belt is reached, wherein when the end of the current time frame is reached before reaching the end of the current belt, designating the occupied cell associated with said end of current time frame as said initial occupied cell's predicted position in a parallel direction, and predicting a final occupied cell for each other occupied cell for said parcel by incrementing each other occupied cell by the number of cell jumps.

3. The method of claim 2, wherein when the end of the current belt is reached before the end of the current time frame, the method further comprises:

calculating, for each occupied cell, a total number of parallel cell jumps to the end of the current time frame based on the speed of the current belt and the speed of a next belt;

computing, for each occupied cell, a remaining distance in the current belt from the length of the current belt and the number of cells from the initial position of each occupied cell to the end of the current belt;

computing, for each occupied cell, the time needed to cover said remaining distance in the current belt from the speed of said current belt and the duration of the current time frame; and computing, for each occupied cell, a final cell based on time needed to cover said remaining distance, the speed of a next belt, and the length of each cell on said next belt.

4. The method of claim 1, wherein predicting a parcel's position in a direction perpendicular to the motion of said conveyor belt system comprises:

counting a number of cell jumps in said perpendicular direction for each occupied cell on a current belt, based on a rotation speed of each parcel, until either an end of a current time frame is reached or an end of the current belt is reached, wherein when the end of the current time frame is reached before reaching the end of the current belt, designating the occupied cells associated with said end of current time frame as said parcel's predicted position in a perpendicular direction.

5. The method of claim 4, wherein when the end of the current belt is reached before the end of the current time frame, the method further comprises:

calculating, for each occupied cell, a total number of perpendicular cell jumps to the end of the current time frame based on duration of the time frame, the speed of the current belt, and the widths of the cells;

computing, for each occupied cell, a number of cells to an edge of the current belt from the width of the current belt and the number of cells from the initial position of each occupied cell to the edge of the current belt;

computing, for each occupied cell, the number of remaining cells from the number of cells to the edge of the current belt and the total number of perpendicular cell jumps, wherein a final cell in an adjacent belt corresponds to a last remaining cell.

6. The method of claim 5, wherein when the number of remaining cells is greater than a number of cells in a width of an adjacent belt, reducing said number of remaining cells by the number of cells in the width of said adjacent belt.

7. The method of claim 1, wherein marking a corresponding cell in a parallel motion table representing motion in a parallel direction comprises:

initializing a bit table representing belt motion in the parallel direction to one for all occupied cells and zero for all unoccupied cells, wherein each cell of a belt is represented by one bit in said table; and marking an entry corresponding to a cell's predicted parallel position by setting the corresponding bit to one for occupied cells, and zero for unoccupied cells.

8. The method of claim 1, wherein marking a corresponding cell in a perpendicular motion table representing motion in a perpendicular direction comprises:

initializing a bit table representing belt motion in the perpendicular direction to one for all occupied cells and zero for all unoccupied cells, wherein each cell of a belt is represented by one bit in said table; and marking an entry corresponding to a cell's predicted perpendicular position by setting the corresponding bit to one for occupied cells, and zero for unoccupied cells.

9. The method of claim 1, wherein each cell of the parallel motion table and the perpendicular motion table is represented by an associated counter byte in said collision detection table, a same cell in both parallel motion table and the perpendicular motion table is represented by a same byte in said collision detection table.

10. The method of claim 1, wherein when a parcel's predicted cell position after a predetermined time frame is on a subsequent belt, further comprising the steps of:
   shifting a bit map for a subsequent belt by a number of units representing a number of cells corresponding to a distance said parcel is displaced on said subsequent belt during said time frame; and
   for each marked entry in said parallel motion table and said perpendicular motion table,
      creating an temporary bit table with all bits initialized to zero;
      setting a first bit set to one and shifting said temporary table in a same direction as said bit map by a number of bits representing a final cell position of said parcel on said subsequent belt; and
      performing a bitwise OR operation of bits in said temporary table with said bit map.

11. A computer-assisted method for detecting collisions of parcels on a conveyor belt system comprising a rectangular array of individual conveyor belts, the method performed by said computer comprising the steps of:
   representing each belt of a conveyor belt system with a rectangular cell mesh of columns and rows, wherein each belt moves with an associated belt speed;
   for each parcel on said belt system,
      identifying those cells on a belt where each said parcel contacts said belt;
      marking a parcel's new cell position after a predetermined time frame in a direction parallel to the motion of said conveyor belt system;
      marking a parcel's new cell position after said predetermined time frame in a direction perpendicular to the motion of said conveyor belt system,
      wherein when a parcel's new cell position after a predetermined time frame is on a subsequent belt,
         shifting a bit map for a subsequent belt by a number of units representing a number of cells corresponding to a distance said parcel is displaced on said subsequent belt during said time frame, and
         for each marked new cell position in said parallel direction and said perpendicular direction,
            creating an temporary bit table with all bits initialized to zero,
            setting a first bit set to one and shifting said temporary table in a same direction as said bit map by a number of bits representing a final cell position of said parcel on said subsequent belt, and
            performing a bitwise OR operation of bits in said temporary table with said bit map.

12. The method of claim 11, wherein marking a parcel's new cell position in a parallel direction comprises marking a corresponding entry in a parallel motion table representing motion in a parallel direction, and wherein marking a parcel's new cell position in a perpendicular direction comprises marking a corresponding entry in a perpendicular motion table representing motion in a perpendicular direction.

13. The method of claim 12, further comprising:
   for each marked cell in said parallel motion table, incrementing a collision detector counter in a corresponding cell in a collision detection table;
   for each marked cell in said perpendicular motion table, incrementing a collision detector counter in a corresponding cell in said collision detection table; and
   checking the collision detector counter value in each cell in said collision detection table, wherein a value greater than or equal to 3 is indicative of a parcel collision.

14. A program storage device readable by a computer, tangibly embodying a program of instructions executable by the computer to perform the method steps for detecting collisions of parcels on a conveyor belt system comprising a rectangular array of individual conveyor belts, said method comprising the steps of:
   representing each belt of a conveyor belt system with a rectangular cell mesh of columns and rows, wherein each belt moves with an associated belt speed;
   for each parcel on said belt system,
      identifying those cells on a belt where each said parcel contacts said belt;
      predicting a parcel's cell position after a predetermined time frame in a direction parallel to the motion of said conveyor belt system;
      marking a corresponding entry in a parallel motion table representing motion in a parallel direction;
      for each marked cell in said parallel motion table, incrementing a collision detector counter in a corresponding cell in a collision detection table;
      predicting a parcel's cell position after said predetermined time frame in a direction perpendicular to the motion of said conveyor belt system;
      marking a corresponding entry in a perpendicular motion table representing motion in a perpendicular direction; and
      for each marked cell in said perpendicular motion table, incrementing a collision detector counter in a corresponding cell in said collision detection table; and
   checking the collision detector counter value in each cell in said collision detection table, wherein a value greater than or equal to 3 is indicative of a parcel collision.

15. The computer readable program storage device of claim 14, wherein predicting a parcel's position in a direction parallel to the motion of said conveyor belt system comprises:
   calculating a number of cell jumps in said parallel direction for an initial occupied cell on a current belt, based on the speed of said current belt, until either an end of a current time frame is reached or an end of the current belt is reached,
   wherein when the end of the current time frame is reached before reaching the end of the current belt, designating the occupied cell associated with said end of current time frame as said initial occupied cell's predicted position in a parallel direction, and predicting a final occupied cell for each other occupied cell for said parcel by incrementing each other occupied cell by the number of cell jumps.

16. The computer readable program storage device of claim 15, wherein when the end of the current belt is reached before the end of the current time frame, the method further comprises:
   calculating, for each occupied cell, a total number of parallel cell jumps to the end of the current time frame based on the speed of the current belt and the speed of a next belt;

computing, for each occupied cell, a remaining distance in the current belt from the length of the current belt and the number of cells from the initial position of each occupied cell to the end of the current belt;

computing, for each occupied cell, the time needed to cover said remaining distance in the current belt from the speed of said current belt and the duration of the current time frame; and computing, for each occupied cell, a final cell based on time needed to cover said remaining distance, the speed of a next belt, and the length of each cell on said next belt.

17. The computer readable program storage device of claim 14, wherein predicting a parcel's position in a direction perpendicular to the motion of said conveyor belt system comprises:

counting a number of cell jumps in said perpendicular direction for each occupied cell on a current belt, based on a rotation speed of each parcel, until either an end of a current time frame is reached or an end of the current belt is reached, wherein when the end of the current time frame is reached before reaching the end of the current belt, designating the occupied cells associated with said end of current time frame as said parcel's predicted position in a perpendicular direction.

18. The computer readable program storage device of claim 17, wherein when the end of the current belt is reached before the end of the current time frame, the method further comprises:

calculating, for each occupied cell, a total number of perpendicular cell jumps to the end of the current time frame based on duration of the time frame, the speed of the current belt, and the widths of the cells;

computing, for each occupied cell, a number of cells to an edge of the current belt from the width of the current belt and the number of cells from the initial position of each occupied cell to the edge of the current belt;

computing, for each occupied cell, the number of remaining cells from the number of cells to the edge of the current belt and the total number of perpendicular cell jumps, wherein a final cell in an adjacent belt corresponds to a last remaining cell.

19. The computer readable program storage device of claim 18, wherein when the number of remaining cells is greater than a number of cells in a width of an adjacent belt, the method comprises reducing said number of remaining cells by the number of cells in the width of said adjacent belt.

20. The computer readable program storage device of claim 14, wherein marking a corresponding cell in a parallel motion table representing motion in a parallel direction comprises:

initializing a bit table representing belt motion in the parallel direction to one for all occupied cells and zero for all unoccupied cells, wherein each cell of a belt is represented by one bit in said table; and marking an entry corresponding to a cell's predicted parallel position by setting the corresponding bit to one for occupied cells, and zero for unoccupied cells.

21. The computer readable program storage device of claim 14, wherein marking a corresponding cell in a perpendicular motion table representing motion in a perpendicular direction comprises:

initializing a bit table representing belt motion in the perpendicular direction to one for all occupied cells and zero for all unoccupied cells, wherein each cell of a belt is represented by one bit in said table; and marking an entry corresponding to a cell's predicted perpendicular position by setting the corresponding bit to one for occupied cells, and zero for unoccupied cells.

22. The computer readable program storage device of claim 14, wherein each cell of the parallel motion table and the perpendicular motion table is represented by an associated counter byte in said collision detection table, a same cell in both parallel motion table and the perpendicular motion table is represented by a same byte in said collision detection table.

23. The computer readable program storage device of claim 14, wherein when a parcel's predicted cell position after a predetermined time frame is on a subsequent belt, the method further comprising the steps of:

shifting a bit map for a subsequent belt by a number of units representing a number of cells corresponding to a distance said parcel is displaced on said subsequent belt during said time frame; and for each marked entry in said parallel motion table and said perpendicular motion table, creating an temporary bit table with all bits initialized to zero;

setting a first bit set to one and shifting said temporary table in a same direction as said bit map by a number of bits representing a final cell position of said parcel on said subsequent belt; and performing a bitwise OR operation of bits in said temporary table with said bit map.

* * * * *